United States Patent
Hartmeyer et al.

(10) Patent No.: US 10,096,863 B2
(45) Date of Patent: Oct. 9, 2018

(54) ELECTRICAL ACCUMULATOR WITH WATER SENSOR

(71) Applicant: Torqeedo GmbH, Gilching (DE)

(72) Inventors: Marc Hartmeyer, Munich (DE); Philipp Krieger, Feldafing (DE); Jens Biebach, Tutzing (DE)

(73) Assignee: Torqeedo GmbH, Gilching (DE)

( * ) Notice: Subject to any disclaimer, the term of this patent is extended or adjusted under 35 U.S.C. 154(b) by 468 days.

(21) Appl. No.: 14/442,047

(22) PCT Filed: Nov. 11, 2013

(86) PCT No.: PCT/EP2013/003392
§ 371 (c)(1),
(2) Date: May 11, 2015

(87) PCT Pub. No.: WO2014/072071
PCT Pub. Date: May 15, 2014

(65) Prior Publication Data
US 2015/0288036 A1   Oct. 8, 2015

(30) Foreign Application Priority Data

Nov. 12, 2012 (DE) .................. 10 2012 021 994
Feb. 3, 2013 (EP) ...................... 13000547

(51) Int. Cl.
*H01M 10/42* (2006.01)
*B63B 43/00* (2006.01)
*B63H 20/00* (2006.01)
*B63H 21/17* (2006.01)
(Continued)

(52) U.S. Cl.
CPC ........... *H01M 10/425* (2013.01); *B63B 43/00* (2013.01); *B63H 20/007* (2013.01); *B63H 21/17* (2013.01);
(Continued)

(58) Field of Classification Search
None
See application file for complete search history.

(56) References Cited

U.S. PATENT DOCUMENTS

| 5,292,269 A | 3/1994 | Plost et al. |
| 5,516,312 A | 5/1996 | Reed |

(Continued)

FOREIGN PATENT DOCUMENTS

| EP | 1 806 280 A1 | 7/2007 |
| WO | WO 2010/127911 A1 | 11/2010 |

(Continued)

OTHER PUBLICATIONS

U.S. patent application, "Boat with High-Voltage System", U.S. Appl. No. 14/442,051, filed May 11, 2015, First named inventor: Jens Biebach et al.

(Continued)

*Primary Examiner* — Thienvu Tran
*Assistant Examiner* — David M Stables
(74) *Attorney, Agent, or Firm* — Crowell & Moring LLP (57) ABSTRACT

A boat is disclosed. The boat includes an electrical storage having a storage element electrically connected to a positive and a negative pole. The boat also includes a water sensor configured to determine whether one of the poles is in contact with water, and a disconnection device operatively connected to the water sensor and configured to interrupt the electrical connection between at least one of the poles and the storage element when the water sensor determines that one of the poles is in contact with water.

17 Claims, 5 Drawing Sheets

(51) Int. Cl.
*H02H 5/08* (2006.01)
*H01M 10/48* (2006.01)

(52) U.S. Cl.
CPC ............ *H01M 10/48* (2013.01); *H02H 5/083* (2013.01); *H01M 2220/20* (2013.01)

(56) References Cited

U.S. PATENT DOCUMENTS

| | | | |
|---|---|---|---|
| 6,669,516 B1 | 12/2003 | Husted et al. | |
| 2009/0212740 A1* | 8/2009 | Felps | G01R 31/3606 320/134 |
| 2011/0135984 A1 | 6/2011 | Ekchian | |
| 2011/0244739 A1 | 10/2011 | Daikoku et al. | |
| 2012/0106017 A1* | 5/2012 | Schumacher | B60L 3/04 361/114 |

FOREIGN PATENT DOCUMENTS

| | | | |
|---|---|---|---|
| WO | WO 2010127911 A1 * | 11/2010 | ................ B60L 3/04 |
| WO | WO 2014/072070 A1 | 5/2014 | |
| WO | WO 2014/072072 A1 | 5/2014 | |
| WO | WO 2014/072073 A1 | 5/2014 | |
| WO | WO 2014/072074 A1 | 5/2014 | |

OTHER PUBLICATIONS

U.S. patent application, "Boat with Electric Drive", U.S. Appl. No. 14/442,056, filed May 11, 2015, First named inventor: Jens Biebach et al.

U.S. patent application, "Boat with Electric Drive", U.S. Appl. No. 14/442,058, filed May 11, 2015, First named inventor: Jens Biebach et al.

U.S. patent application, "Boat with Electric Drive and Emergency Off Switch", U.S. Appl. No. 14/442,062, filed May 11, 2015, First named inventor: Jens Biebach et al.

PCT/EP2013/003392, International Search Report dated Feb. 7, 2014 (Three (3) pages).

European Office Action issued in European counterpart application No. 13 796 000.1-1015 dated Jul. 31, 2018 (Six (6) pages).

* cited by examiner

ELECTRICAL ACCUMULATOR WITH WATER SENSOR

This application claims the priority of International Application No. PCT/EP2013/003392, filed Nov. 11, 2013, German Patent Document No. 10 2012 021 994.6, filed Nov. 12, 2012, and European Patent Document No. 13000547.3, filed on Feb. 3, 2013, the disclosures of which are expressly incorporated by reference herein.

BACKGROUND AND SUMMARY OF THE INVENTION

The invention relates to a boat with an electrical storage having at least one storage element and a positive and a negative pole, the poles being electrically conductively connected to the storage element. The invention also relates to a method for the safety disconnection of such an electrical storage on a boat.

If electrical contacts, between which a DC voltage is applied, are brought into contact with water, this results in electrolysis. Here, galvanic contact corrosion occurs and oxyhydrogen is formed. Oxyhydrogen is highly explosive and poses a corresponding potential danger. With voltages that are higher than extra-low voltage, i.e. higher than 60 V, individuals are additionally exposed to the risk of electrical accidents.

Electrical outboard motors for boats have therefore been equipped previously with a housing according to protection class IP67. These housings protect the electrical outboard motor against the infiltration of water in the case of temporary submersion. The test standard for this prescribes a water tightness in 1 m depth over 30 minutes.

Protection class IP67 guarantees the water tightness at a submersed depth of one meter only for half an hour. In the event of a boat accident, however, the outboard motor may also sink to greater depths and/or might not be salvaged from the water within half an hour. In addition in the case of an accident the insulation of the housing may be damaged, and there is therefore again the risk of oxyhydrogen formation and electrical shock.

An object of the present invention is therefore to provide a method and a device with which these risks are avoided.

This problem is solved by a boat comprising an electrical storage having at least one storage element and a positive and a negative pole, the poles being electrically conductively connected to the storage element, said electrical storage being characterized in that a water sensor is provided, which determines whether one of the poles is in contact with water, the water sensor being operatively connected to a disconnection device, which is used to interrupt the electrically conductive connection between at least one of the poles and the storage element.

The use of protection class IP67 indeed provides important basic protection. Due to the time limitation and the limitation given from the maximum depth, however, risks remain that are reduced or eliminated by the installation according to the invention.

An important field of application of the invention is constituted by electrical storages on boats, in particular on boats with electric drive.

The invention proposes, in the case of an accident, when one of the poles of the electrical storage comes into contact with water, to disconnect the pole or poles from the power supply so as to at least minimize consequent damage and in particular so as to avoid the above-described contact corrosion. A water sensor is therefore provided, which detects the contact of one of the poles with water. If one of the poles is in water or under water or if a certain moisture threshold has been exceeded, the pole in question or both poles is/are disconnected from the power supply. The water sensor for this purpose is operatively connected to a disconnection device, which in this case separates the electrically conductive connection between at least one of the poles and the electrical storage.

The electrical storage is in particular a battery or an accumulator. The invention provides a particular safety increase in the case of electrical storages, in particular batteries or accumulator, that provide a voltage of more then 60 V, more than 100 V, or more than 200 V. The safety circuit according to the invention is thus used for example advantageously on boats that have a voltage supply of 300 V or 400 V.

The water sensor registers when water is present at the point to be monitored. For example, an optical measurement principle can be used in the water sensor, in which case the presence of water is determined by means of a light source and a light receiver. Depending on the embodiment of the water sensor, water at the measurement point will interrupt the luminous flux between light source and light receiver or will only enable said luminous flux via scattering. A change of the luminous flux thus indicates the presence of water at the measurement point.

Alternatively, the water sensor is based on an electrical measurement principle. The water sensor in this case has a first and a second measuring contact and also a measuring circuit for determining an electrical measurand between the first and the second measuring contact. When the gap between the two measuring contacts is filled with water, which gap for example is initially filled with air, the resistance and the conductivity between the measuring contacts thus change. This change is interpreted by the water sensor as the presence of water.

In a further embodiment one of the poles of the electrical storage is used as one of the measuring contacts. Either the positive pole or the negative pole of the electrical storage is used as first measuring contact. The water is detected by measuring an electrical variable, for example the electrical resistance, between one of the poles and the second measuring contact. This approach has the advantage that the water is detected in the immediate vicinity of one pole of the electrical storage.

In a further embodiment of the invention the measuring circuit is connected via a series resistor to the positive and/or the negative pole, such that the current from the measuring circuit or into the measuring circuit is limited and even in the case of a hard short circuit between a pole of the measuring circuit and the pole of the battery, which is not part of the measuring circuit, a critical value is not exceeded. The measuring circuit is normally designed to determine the impedance between one measuring contact and a second measuring contact, which may also be a battery pole. For the case that a battery contact itself is reference contact, it must be ensured that no damage to the measuring circuit is caused in the case of a conductive connection between the non-referenced contact and the contact of the measuring circuit.

In a further embodiment there is a measuring circuit between a measuring contact and each one of the battery contacts, which is expedient in particular in the case of batteries of large physical dimension. Batteries are generally installed horizontally, such that all battery poles are at the same height above the water level. An accident may result in an inclined position, in which case one of the battery poles then over time has significantly more contact with the infiltrating water and then the storage is disconnected decidedly prior to water contact of the second storage pole.

In a further embodiment both storage poles are used exclusively as measuring contacts. This method presupposes that the impedance active at the storage poles in the fault-free state is known, which is difficult in particular in systems with different degrees of expansion. If there is then a significant impedance change, the battery poles are disconnected.

A further embodiment lies in the use of measuring contacts that are not connected at all to the contacts of the electrical storage. These contacts can then be arranged in the boat such that they determine the water contact before the poles of the electrical storage come into contact with the water. The evaluation circuit can be located inside or outside the storage.

The invention is used preferably in electrical storages located on boats, rather preferably in electrical outboard motors. In particular in the case of outboard drives, in which the electrical storage or the battery is located in the outboard drive, the invention provides a considerable safety increase.

The method according to the invention for the safety disconnection of an electrical storage located on a boat, the electrical storage having a positive and a negative pole is characterized in that it is detected whether one of the poles is in contact with water and, in the case of the detection of water, the electrically conductive connection between at least one of the poles and the electrical storage is interrupted.

Water is preferably detected by means of an electrical measuring method, in particular by measuring the electrical conductivity or the electrical resistance.

One of the objectives of the invention is to prevent contact corrosion in the case of contact of the poles of the electrical storage with water. The electrical resistance in the surroundings of at least one of the poles is therefore advantageously determined. The term "in the surroundings" is to be understood in particular to mean that the measurement is taken at a distance of less than 30 cm, less than 20 cm, or less than 10 cm from the pole. Both measuring contacts are provided at a distance of less than 30 cm, less than 20 cm, or less than 10 cm from the pole. One of the poles itself is particularly preferably used as measuring contact, and the resistance between the pole and the second measuring contact is detected.

The measuring contacts are preferably arranged spatially such that when the storage or other boat components is/are installed, there cannot be any undesired contact by the tool used. Undesired contact in the case of electrical storage s can be prevented inter alia by providing a mechanical barrier between the poles of the storage, which mechanical barrier rules out contact at a short, direct linear distance. In such a case it is expedient for the measuring contact to be located on the side of the barrier on which the storage pole having no connection to the measuring circuit is also arranged.

The detected resistance value is compared for example with a reference value. When the deviation between measured resistance value and the reference value exceeds a certain threshold or when the absolute value of the measured resistance exceeds or falls below a certain threshold, this is interpreted as the presence of water, and one of the poles or both poles of the electrical storage is/are disconnected.

Water is preferably detected by means of an AC voltage measuring method in order to minimize galvanic contact corrosion. With use of an AC voltage source a capacitance can preferably be used as current-limiting impedance, such that an excessively high direct current towards the opposite pole of the storage, which is not part of the sensor circuit, is impossible.

The presence of water at one or both poles of the electrical storage can cause not only the described galvanic contact corrosion, but also damage to other components conductively connected to the electrical storage. If water is detected further electrical consumers are therefore advantageously separated from the electrical storage. In particular it has proven to be favourable in such a case to also quickly separate the electric motor from the electrical storage in order to prevent damage at the electric motor.

In another embodiment a monitoring line is provided, via which all components, in particular the electric motor, connected to the electrical storage can be disconnected. The monitoring line is used for safety disconnection when one of the poles comes into contact with water.

In addition to the water detection according to the invention the electrical storage is advantageously provided with further safety devices. The further safety devices preferably comprise means for detecting and for protecting against short circuits, overcharging or deep discharging of the electrical storage, and/or overheating of the battery cells and/or the electronics. Some or all of the safety devices, for example the water sensor or the above-mentioned further safety devices, are particularly advantageously designed to be redundant. In other words, some or all safety-relevant functions are provided twice. It is thus ensured that the failure of one safety device does not lead to a potential safety problem.

In a further advantageous embodiment of the invention the electrical storage, in particular a battery, is equipped with a pyrotechnic fuse, which in the case of an accident reliably separates the electric motor and/or other electrical components connected to the electrical storage from the electrical storage. The pyrotechnic fuse for example comprises a pyrotechnic, flammable or explosive substance. If the current flowing via the pyrotechnic fuse exceeds a certain limit value, an ohmic resistor in the fuse heats up to such an extent that the pyrotechnic substance is ignited and the electrically conductive connection is interrupted.

The invention and further advantageous details of the invention will be explained by way of example in greater detail hereinafter on the basis of the schematic drawing.

DETAILED DESCRIPTION OF THE DRAWINGS

Figure 1:
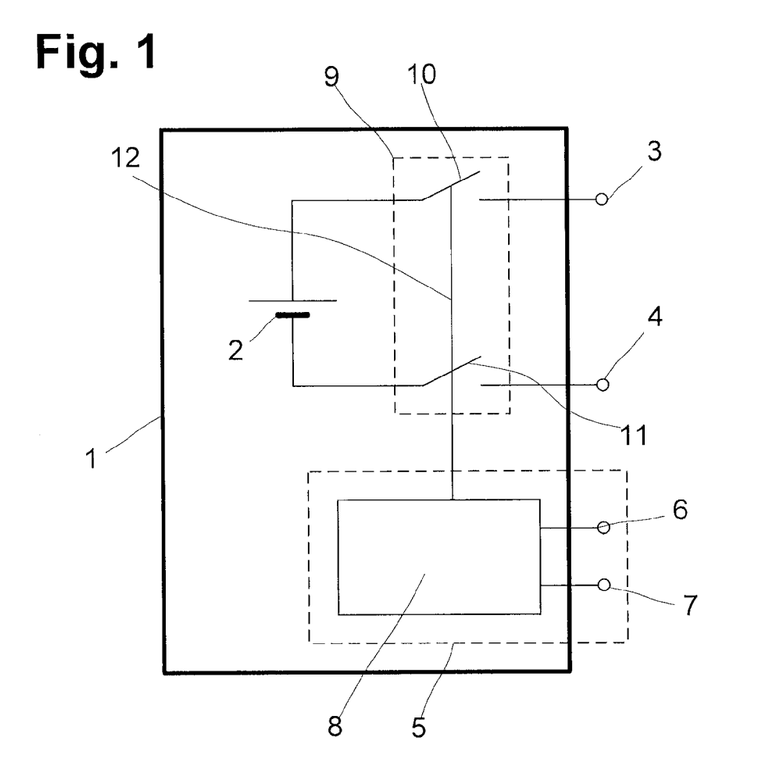
FIG. 1 shows a battery according to an embodiment of the invention with water sensor.

FIG. 1 shows the housing 1 of an electrical storage, in particular a battery or an accumulator, which has a plurality of storage elements, in particular galvanic cells. The cells 2 are connected to a positive pole (plus pole) 3 and to a negative pole (minus pole) 4. A disconnection device 9 with two switches 10, 11, which are arranged in the line between the cells 2 and the plus pole 3 and in the line between the cells 2 and the minus pole 4, are arranged in the connection between the cells 2 and the poles 3, 4. By opening the switches 10, 11, the electrically conductive connection between the cells 2 and the poles 3, 4 can be interrupted and the poles 3, 4 can be disconnected from the power supply.

The electrical storage is preferably used as voltage source for an electric drive on a boat, in particular for outboard motors.

A water sensor 5 is provided in the housing 1. The water sensor 5 comprises a measuring circuit 8 and also two measuring contacts 6, 7, which are arranged outside the housing 1 or on the exterior thereof. The measuring circuit 8 is connected via a control line 12 to the switches 10, 11.

The measuring circuit 8 determines the electrical resistance between the two measuring contacts 6, 7. When the measuring contacts 6, 7 come into contact with water the electrical resistance between the measuring contacts 6, 7 thus changes. This change is interpreted by the measuring circuit 8 as the presence of water, and the switches 10, 11 are controlled and opened via the control line 12. The poles 3, 4 of the electrical storage are thus disconnected from the power source so as to avoid contact corrosion and minimize further consequential damage.

Figure 2:
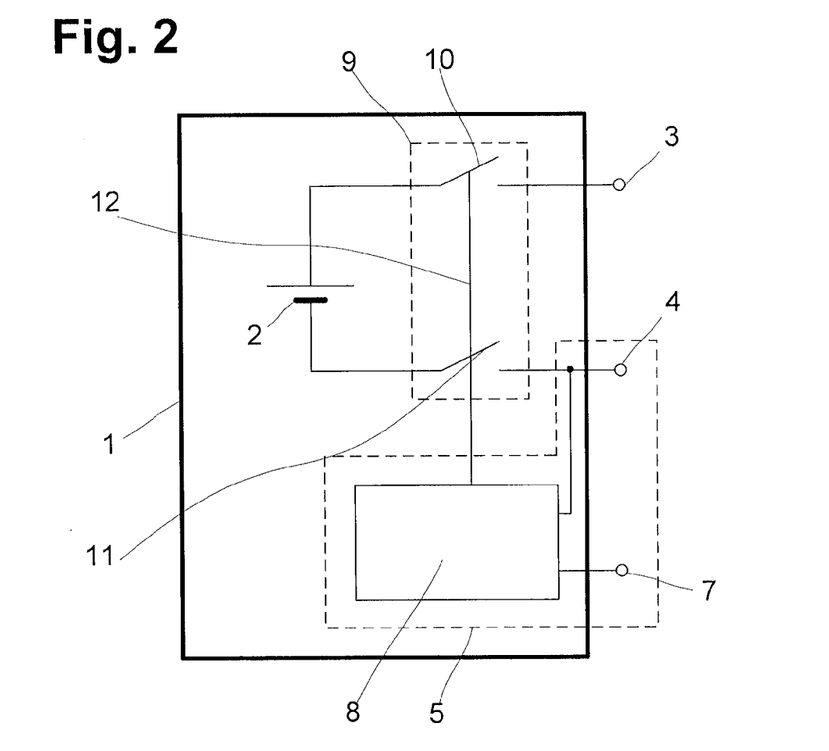
FIG. 2 shows an embodiment of the invention.

FIG. 2 shows an alternative embodiment of the invention. This differs from the version shown in FIG. 1 in that the minus pole 4 serves measuring contact. In addition, like components are characterized in all figures by like reference numerals.

Water is detected in this case by measuring an electrical variable, for example the electrical resistance, between the minus pole 4 and the second measuring contact 7. This approach has the advantage that water is detected in the immediate vicinity of one pole 4 of the electrical storage.

Figure 3:
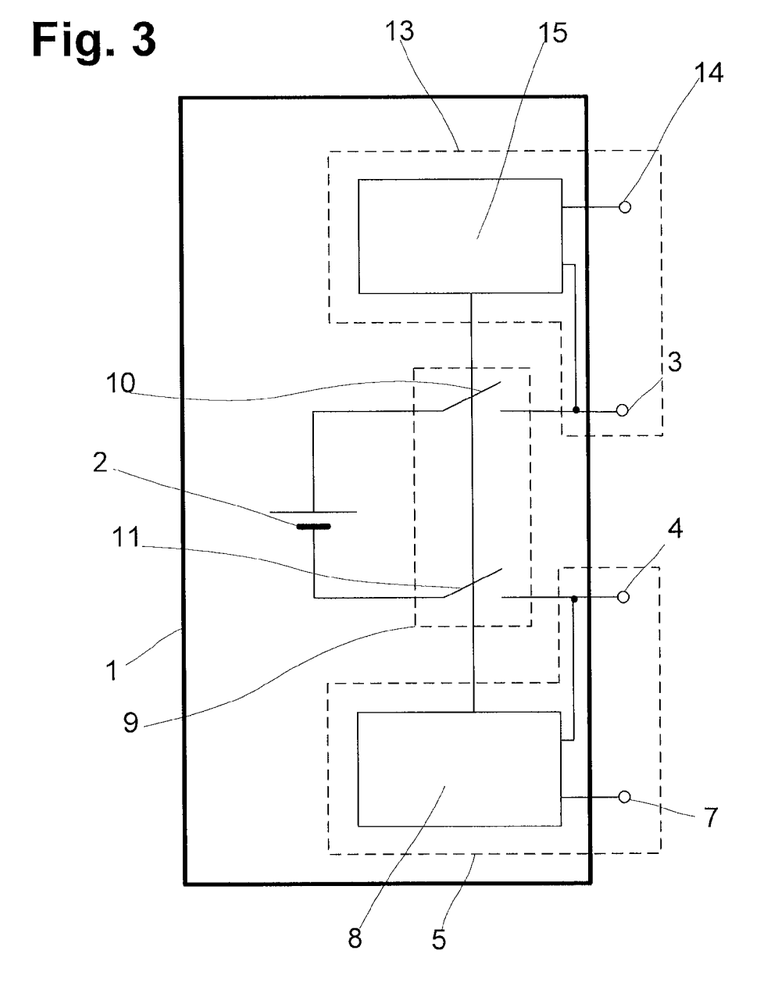
FIG. 3 shows an embodiment of the invention with two water sensors.

FIG. 3 illustrates a further embodiment in which two water sensors 5, 13 are provided. The water sensor 5 is, as described with reference to FIG. 2, connected to the minus pole 4 of the electrical storage. The minus pole 4 is used as one of the two measuring contacts of the water sensor 5. The second water sensor 13 is designed accordingly, the plus pole 3 of the electrical storage being used as one of the measuring contacts 3, 14.

The measuring circuit 8 registers the presence of water in the region of the minus pole 4, the measuring circuit 13 registers the presence of water in the region of the plus pole 3. This has advantages in the case of batteries of large physical dimension. Batteries are generally installed horizontally, such that all battery poles 3, 4 are at the same height above the water level. An accident may result in an inclined position, in which case one of the battery poles 3, 4 then over time has significantly more contact with the infiltrating water. The variant of the invention shown in FIG. 3 then allows a premature disconnection of the storage, decidedly before the second storage pole 3, 4 comes into contact with the water.

Figure 4:
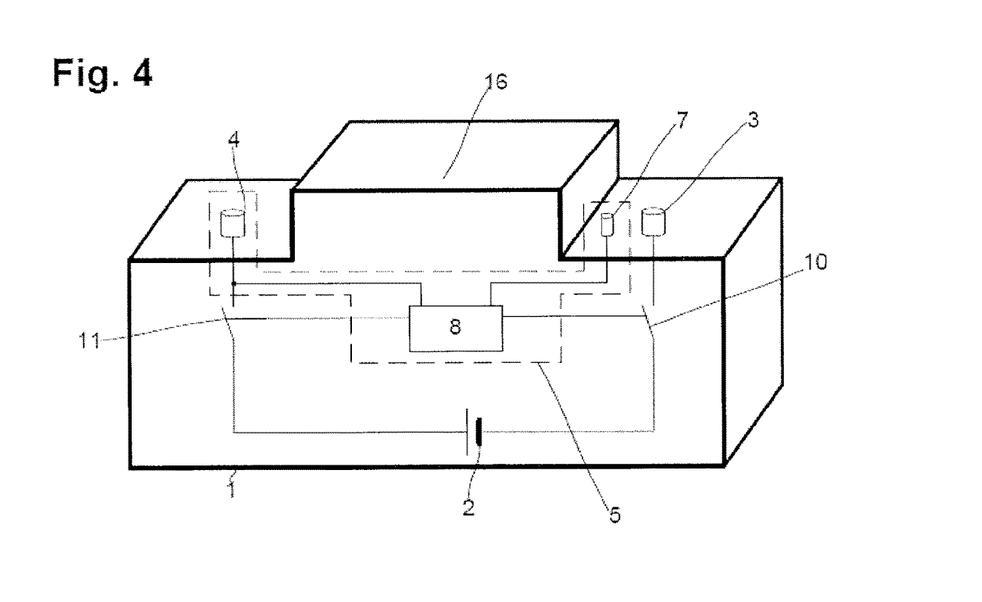
FIG. 4 shows a battery according to embodiments of the invention with mechanical protection in order to avoid undesired short circuits.

FIG. 4 illustrates an electrical storage according to the invention, in which a mechanical barrier 16 is provided so as to prevent any undesired contact by the used tool between the battery poles 3, 4 and the measuring contact 7 as the storage or other boat components is/are installed.

The electrical circuit shown in FIG. 4 corresponds to the circuit according to FIG. 2. A mechanical barrier 16, for example in the form of an elevation of the housing, is provided between the poles 3, 4 of the electrical storage. The barrier 16 is designed such that it is located linearly in the straight-line connection between the two poles 3, 4. In this way the undesired establishment of an electrically conductive connection between the two poles 3, 4, for example by means of a tool, is prevented or at least hindered.

When the water sensor 5, as illustrated, is designed such that one of the poles 4 serves as measuring contact, it is thus expedient to provide the measuring contact on the side of the barrier 16 on which the pole 3 of the storage having no connection to the measuring circuit is arranged.

Figure 5:
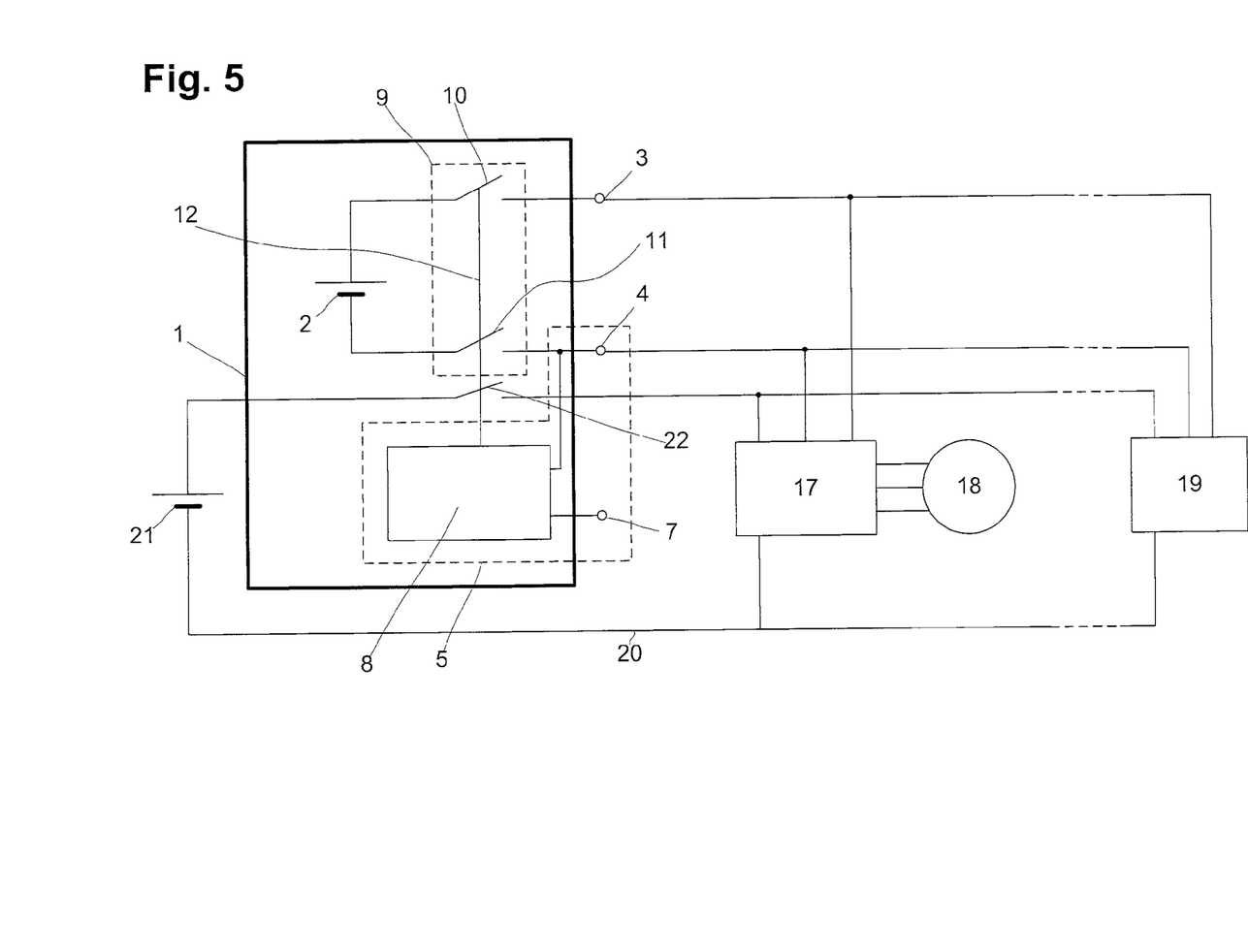
FIG. 5 shows a further embodiment of the invention.

Lastly, FIG. 5 illustrates an embodiment of the invention in which, in the case of an accident in which the water sensor 5 detects the contact with water, not only the poles 3, 4 but also further electrical components 17, 18, 19 are disconnected.

The shown circuit of the water sensor 5 corresponds to the circuit shown in FIG. 2. Of course, the concept explained hereinafter can also be applied accordingly in circuits according to FIG. 1 or 3.

To this end, a monitoring line 20 is additionally provided, which is connected to a low-volt voltage source 21. In the example shown in FIG. 5 a motor controller 17, which controls an electric motor 18, and a further component 19 are connected to the battery poles 3, 4. The monitoring line 12 is also connected to the motor control 17 and the further component 19. In addition, a switch 22 is provided in the monitoring line 20, via which switch the monitoring line 20 can be separated.

In the case of a problem or accident determined by the water sensor 5, the measuring circuit 8 not only opens the switches 10, 11 in order to disconnect the battery poles 3, 4 from the power supply, but the monitoring line 20 is also interrupted by opening the switch 22. A problem is thus signalled to the motor control 17 and the further component 19. The motor control 17 will disconnect the electric motor 18, and the further component 19 is also switched off. In this way, not only is galvanic contact corrosion at the poles 3, 4 prevented, but damage to the other components 17, 18, 19 conductively connected to the cells 2 is also counteracted.

The invention claimed is:

1. A boat comprising:
   an electrical storage having a storage element electrically connected to a positive and a negative pole;
   a water sensor configured to determine whether one of the poles is in contact with water;
   a disconnection device operatively connected to the water sensor and configured to interrupt the electrical connection between at least one of the poles and the storage element,
   wherein either:
   (a) the water sensor comprises:
      a first and a second measuring contact, the first and second measuring contacts separated from each other by a gap between the first and second measuring contacts; and
      a measuring circuit between the first and the second measuring contact, the measuring circuit configured to determine an electrical measurement value present in the gap between the first and second measuring contacts,
      wherein a change of the measurement value indicates the presence of water in the gap between the first and second measuring contacts; or
   (b) the water sensor employs an optical measurement principle, the presence of water being determined by means of a light source and a light receiver arranged between a measurement point, water at the measurement point interrupting luminous flux between the light source and the light receiver or enabling luminous flux via scattering, and a change of the luminous flux indicating the presence of water at the measurement point.

2. The boat of claim 1, wherein one of the positive and/or the negative pole of the electrical storage corresponds to the first measuring contact.

3. The boat of claim 1, wherein the measuring circuit is connected via a series resistor to the positive and the negative poles.

4. The boat of claim 1, wherein a voltage of more than 60 V is applied between the poles of the electrical storage.

5. The boat of claim 1, wherein the electrical storage comprises a battery or an accumulator.

6. The boat of claim 1, wherein the positive and the negative poles correspond to measuring contacts.

7. The boat of claim 1, wherein the boat further comprises an electric motor.

8. The boat of claim 1, further comprising:
a second measuring circuit between a third measuring contact and a fourth measuring contact, the second measuring circuit configured to determine the electrical measurement value present in a gap between the third and fourth measuring contacts,
wherein the positive pole of the electrical storage corresponds to the first measuring contact, and the negative pole of the electrical storage corresponds to the third measuring contact.

9. The boat of claim 1,
wherein when the gap between the first and second measuring contacts is filled with air, the resistance and conductivity between the first and second measuring contacts comprise respective first values,
wherein when the gap between the first and second measuring contacts is filled with water, the resistance and/or the conductivity between the first and second measuring contacts changes from the respective first values, and
wherein the water sensor is configured to determine on the basis of the change of the resistance and/or the conductivity whether as the water is present between the first and second measuring contacts.

10. The boat of claim 1, wherein the measuring contacts are not connected to the poles of the electrical storage.

11. The boat of claim 1, wherein the measuring circuit comprises an AC voltage.

12. A method for safely disconnecting an electrical storage of a boat, the electrical storage having at least one storage element electrically connected to a positive and a negative pole, the method comprising:

detecting whether one of the poles is in contact with water, and
interrupting the electrical connection between at least one of the poles and the storage element in the event that one of the poles is detected to be in contact with water,
wherein detecting whether one of the poles is in contact with water either:
(a) includes determining an electrical measurement value present in a gap between a first and a second measuring contact, a change of the electrical measurement value indicating the presence of water in the gap, or
(b) includes an optical measurement principle, the presence of water being determined by means of a light source and a light receiver arranged between a measurement point, water at the measurement point interrupting luminous flux between the light source and the light receiver or enabling luminous flux via scattering, and a change of the luminous flux indicating the presence of water at the measurement point.

13. The method of claim 12, wherein detecting whether one of the poles is in contact with water includes an electrical measuring method.

14. The method of claim 13, wherein the electrical measuring method comprises measuring the electrical resistance in the surroundings of at least one of the poles at a distance of less than 30 cm from the pole.

15. The method of claim 14, wherein the electrical measuring method comprises an AC voltage measuring method.

16. The method of claim 12, further comprising disconnecting additional electrical consumers in the event that one of the poles is detected to be in contact with water.

17. The method of claim 12,
wherein when the gap between the first and second measuring contacts is filled with air, the resistance and conductivity between the first and second measuring contacts comprise respective first values,
wherein when the gap between the first and second measuring contacts is filled with water, the resistance and the conductivity between the first and second measuring contacts change from the respective first values,
wherein the change is interpreted as indicating the presence of water between the first and second measuring contacts.

* * * * *